United States Patent [19]
George

[11] Patent Number: 5,747,948
[45] Date of Patent: May 5, 1998

[54] CONVERGENCE CORRECTION

[75] Inventor: John Barrett George, Carmel, Ind.

[73] Assignee: Thomson Consumer Electronics, Inc., Indianapolis, Ind.

[21] Appl. No.: 856,732

[22] Filed: May 15, 1997

Related U.S. Application Data

[63] Continuation of Ser. No. 493,595, Jun. 22, 1995, abandoned, which is a continuation of Ser. No. 241,025, May 11, 1994, abandoned.

[51] Int. Cl.[6] .............................. G09G 1/28; H01J 29/51; H04N 3/23
[52] U.S. Cl. ...................... 315/368.18; 315/370; 348/746
[58] Field of Search .................... 315/368.18, 368.21, 315/368.23, 370; 348/746, 806

[56] References Cited

U.S. PATENT DOCUMENTS

| | | | |
|---|---|---|---|
| 2,880,358 | 3/1959 | Parker | 315/368.18 |
| 4,395,662 | 7/1983 | Sexton, Jr. | 315/371 |
| 4,563,618 | 1/1986 | Haferl | 315/370 |
| 4,810,939 | 3/1989 | Watanabe et al. | 315/371 |
| 5,164,639 | 11/1992 | Shimaoka et al. | 315/368.18 |
| 5,473,224 | 12/1995 | Tsujihara et al. | 315/368.18 |
| 5,576,774 | 11/1996 | Hosoi et al. | 315/368.18 |

*Primary Examiner*—George C. Issing
*Attorney, Agent, or Firm*—Joseph S. Tripoli; Joseph J. Laks; Francis A. Davenport

[57] ABSTRACT

A correction circuit for a cathode ray tube displaying images subject to distortions comprises: a multiplier for a first horizontal sine waveform and a vertical parabola waveform to define a correction signal, the vertical parabola having a zero value during vertical retrace; a summer for combining a second horizontal sine waveform with the correction waveform to define a composite correction signal, one of the second horizontal sine waveform and the correction signal being first inverted; and, a correction coil for the cathode ray tube receiving the composite correction signal and generating a dynamic magnetic field responsive to the composite correction signal for correcting a residual inner pincushion distortion and for correcting a horizontal linearity distortion imparted by the correction of the residual inner pincushion distortion. When the first and second horizontal rate sine waves are generated by the same waveform generator, the composite correction signal further corrects any distortion due to asymmetry of the horizontal rate sine waveform as generated.

26 Claims, 4 Drawing Sheets

CONVERGENCE CORRECTION

This is a continuation of application Ser. No. 08/493,595, filed Jun. 22, 1995, now abandoned which is a continuation of application Ser. No. 08/241,025 filed on May 11, 1994 now abandoned.

This invention relates generally to the field of convergence correction.

Projection television receivers utilize three cathode ray tubes, only one of which has a projection axis perpendicular to a flat screen. Each of the other two cathode ray tubes has a projection axis which is not perpendicular to the screen. Moreover, no projection axis is parallel with any another projection axis. This geometric orientation of the cathode ray tubes and the screen results in numerous picture distortions. Dynamic convergence correction is a technique in which numerous convergence correction signals are generated and applied to a set of auxiliary convergence correction coils in the horizontal and vertical deflection yokes of each cathode ray tube.

One kind of distortion is East/West pincushion distortion, wherein the vertical lines at the left and right edges of the picture are not straight. In accordance with known techniques, the right and left edge vertical lines can be straightened by modifying the main horizontal deflection signal. A pincushion correction circuit modulates the main horizontal deflection signal by a vertical parabola. The correction field is then a component of the field generated by the main horizontal deflection coil in the yoke.

When the left and right edges are straightened, there remains a residual pincushion distortion of vertical lines that is opposite in curvature and maximum at the respective centers of the left and right picture halves. This is referred to as horizontal inner pin distortion and is illustrated in FIG. 1. Note that the vertical line spacing S is equal along the horizontal center line HCL. Horizontal inner pin distortion can be corrected by a convergence correction signal applied to an auxiliary horizontal convergence correction coil in the picture tube yoke. The proper convergence correction signal can be generated by multiplying a horizontal rate sine waveform by a vertical rate parabola waveform.

Ordinarily, the vertical rate parabola should be zero valued at the screen center and maximum at the top and bottom edges. Clamping the vertical rate parabola to zero volts at the screen center is inconvenient, particularly if certain feedback arrangements are utilized to stabilize the bias of the multiplier, wherein a zero value of the vertical rate waveform is forced during vertical retrace.

Moreover, sampling the vertical rate waveform during the center of scan can result in visible distortion of the picture because the control voltage may change rapidly during sampling. It has been determined that in order to correct for such vertical parabola zero value clamping during vertical retrace, an equal and opposite horizontal sine waveform can be combined with the convergence correction waveform used to correct the residual inner pin distortion.

This produces a composite convergence correction signal that is the same as that possible with the vertical parabola clamped to zero value at picture center.

The application of such a convergence correction signal is illustrated in FIG. 2. The horizontal rate sine waveform is shown along a horizontal axis X and the vertical rate parabola waveform is shown along a vertical axis Y. The vertical curved lines represent the amount of horizontal displacement provided by the convergence correction waveform (that is, the product of the horizontal rate sine and the vertical rate parabola) to correct the horizontal inner pin distortion from FIG. 1 (curved vertical lines having equal spacing at horizontal center line HCL). Each vertical curved line is moved outward from the center the most, whereas the top and bottom of each line is not moved. The straight vertical lines represent the effect of the convergence correction by the product of the horizontal rate sine waveform and the vertical rate parabola waveform. The top and bottom of each vertical line stays in position, and the curved portions of each line move outward from the center until straight, between the tops and bottoms. The maximum displacement of the curved portions occurs at the respective centers of the left and right picture halves. The straightening of the vertical lines causes a sine shaped horizontal inner linearity distortion, in which the spacing S of the vertical lines is not equal. As shown, the spacing is greatest at the center and least toward the left and right edges.

The horizontal inner linearity distortion can be corrected as shown in FIG. 3 by applying an inverted horizontal rate sine waveform, shown along the horizontal axis X, as a convergence correction signal. The curved vertical lines represent the amount of displacement caused by the inverted horizontal sine waveform. It should be understood that the two horizontal rate sine waveforms do not merely cancel one another out. The inverted horizontal waveform is combined with, for example added to, the product waveform (horizontal sine by vertical parabola) generated by a waveform multiplier. The result is straight vertical lines which have equal spacing S.

If the horizontal sine waveform generator produces an asymmetry in the sine wave, the picture will be distorted. It is advantageous to use an inverted version of the same horizontal sine waveform for the horizontal inner linearity correction because the symmetry distortion tends to cancel out.

A correction circuit for a cathode ray tube displaying images subject to distortions, such as those described herein, comprises: means for multiplying a first horizontal rate sine waveform by a vertical rate waveform to define a correction signal; and, means for generating a dynamic magnetic field in the cathode ray tube responsive to the correction signal, the correction signal correcting inner pincushion distortion. The circuit may also comprise means for combining a second horizontal rate sine waveform and the correction signal to define a composite correction signal, the composite correction signal having a first component for correcting the inner pincushion distortion and a second component for correcting a horizontal linearity correction. The circuit may further comprise means for inverting either the correction signal or the second horizontal rate sine waveform. The first and second horizontal rate sine waves may be generated by the same waveform generating means, in which case the composite correction signal further corrects distortion due to asymmetry of the horizontal rate sine waveform as generated. The means for generating the dynamic magnetic field in the cathode ray tube responsive to the composite correction signal may comprise an auxiliary deflection coil, for example, a convergence correction coil.

The circuit may be used with feedback means for stabilizing the multiplier in a manner which forces the vertical rate parabola to have a zero value during vertical retrace. The biasing means may comprise an active feedback circuit responsive to deflection rate reset signals.

Figure 1:
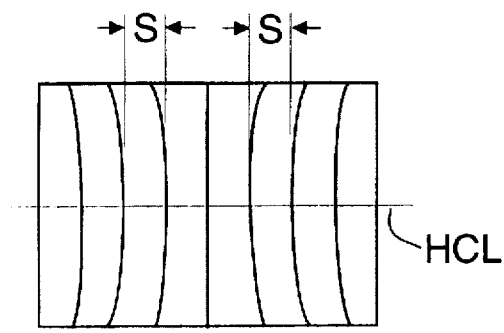
FIG. 1 is a diagram useful for explaining residual horizontal inner pincushion distortion.
Figure 2:
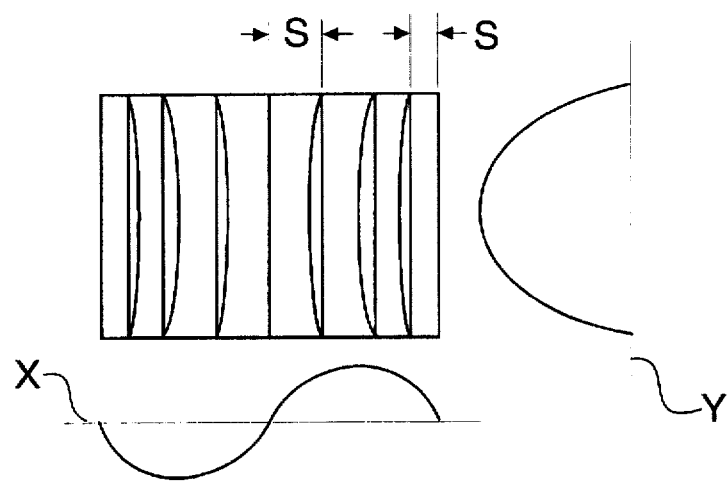
FIG. 2 is a diagram useful for explaining the correction of residual horizontal inner pincushion distortion.
Figure 3:
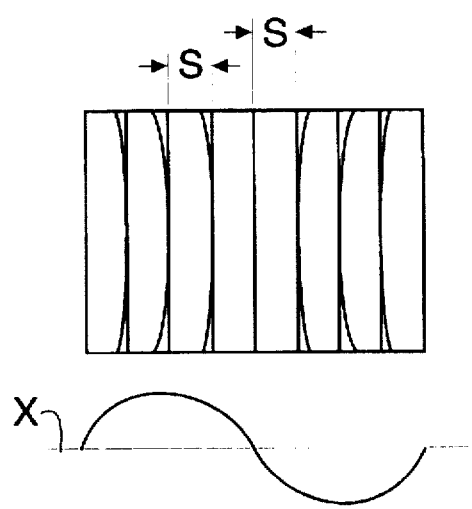
FIG. 3 is a diagram useful for explaining the correction of a horizontal inner linearity distortion imparted by correction of the residual horizontal inner pincushion distortion.
Figure 4:
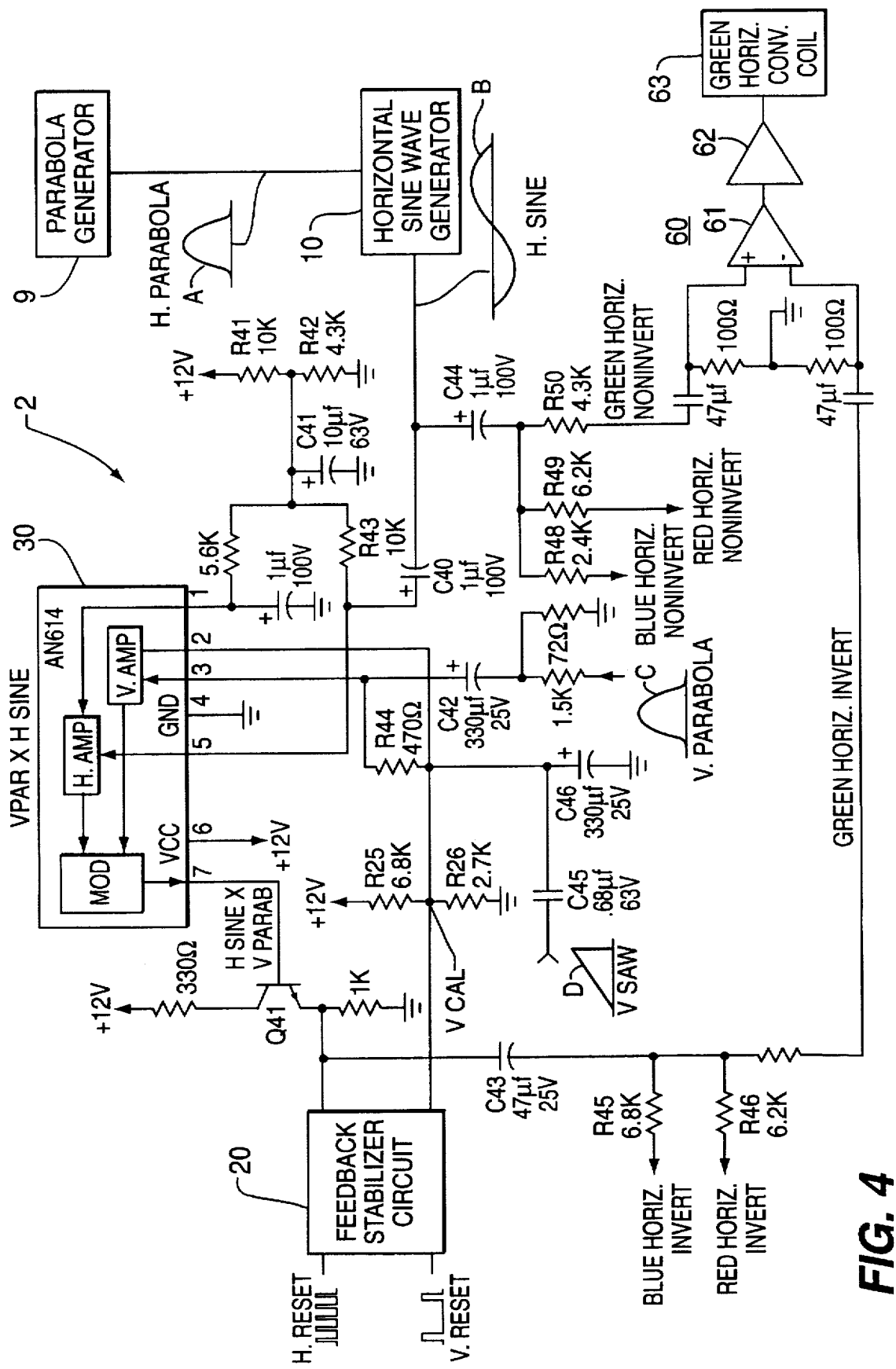
FIG. 4 is a circuit diagram of a circuit for generating convergence correction waveforms to fully correct residual horizontal inner pincushion distortion.

A convergence correction waveform generating circuit 2 is shown in FIG. 4. The circuit 2 comprises a parabola generator 9, a sine wave generator 10, a feedback stabilizing circuit 20, a waveform multiplier 30 and an output stage 60 for a convergence correction signal for the green yoke. Output stages for the red and blue yokes are similar, and not shown.

Figure 5:
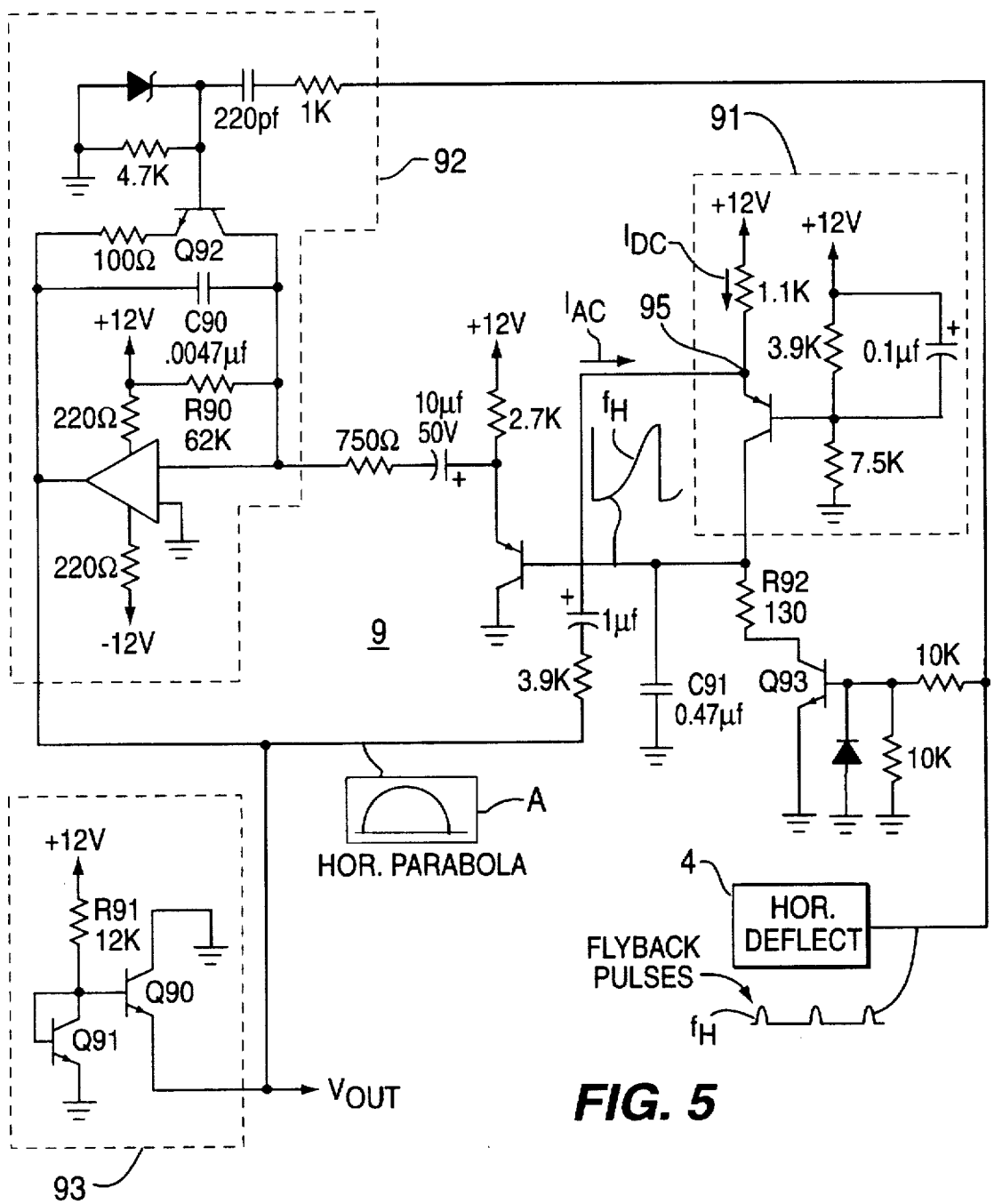
FIG. 5 is a schematic diagram of the parabola generator shown in FIG. 4.

A horizontal rate parabola designated waveform A is supplied by the parabola generator 9 to the sine wave generator 10, which develops the sine wave designated waveform B. The horizontal rate parabola has a positive peak voltage of ±5.6 volts and a negative peak voltage of −0.1 volts. Moreover, the horizontal rate parabola leads the main scan by the delay in the convergence power amplifier, which is about 5 μsec. It is also necessary to shape the parabola to achieve straight horizontal lines in the picture. Such a horizontal rate parabola can be generated by the circuit 9 shown in FIG. 5. With reference to FIG. 5, a constant current $I_{DC}$ is generated by source 91. A variable feedback current $I_{AC}$ is summed with current $I_{DC}$ at junction 95. The composite current charges capacitor C91. Capacitor C91 is periodically discharged by reset circuit 94, by horizontal retrace pulses from horizontal deflection circuit 4, which turn transistor Q93 on at the horizontal rate. The result is a horizontal rate sawtooth signal as shown, which is AC coupled to integrator 92. Integrator 92 includes an operational amplifier U1 having an integrating capacitor C90 and a DC biasing circuit including R90. The output parabola waveform A is AC coupled to junction 95 as the variable current $I_{AC}$. A clamp circuit 93 coupled to the output of integrator 92 includes transistors Q90 and Q91 and resistor R91.

The horizontal reset pulses are AC coupled so that only its rising edge resets the horizontal parabola. This allows integration to start about 5 μsec ahead of the end of the horizontal reset pulses. The DC current bias supplied by resistor R90 to the inverting input of U1 is used at the input to the integrator to tilt the horizontal parabola so that the peak occurs about 5 μsec before the center of horizontal scan. Normally, after peak, the parabola continues in a negative direction until the retrace pulse occurs and resets the output back to zero. However, a negative going overshoot results when the DC bias tilts the horizontal parabola and the useful part of the horizontal parabola ends about 5 μsec before the horizontal reset pules start. This causes horizontal lines to flair at the right edge of the picture. The clamp 93 clips the negative going parabola at about −100 mV. This was determined to be the best level for achieving straight horizontal lines at the right edge of the picture. This level can be critical and is maintained by the clamp 93 even as temperature changes occur. Transistor Q91 receives a nearly constant current at its collector of about 1 mA. A small fraction of this current, determined by the DC beta of transistor Q91, flows into the base of transistor Q90 and determines the base to emitter voltage which is forced by feedback to also be the collector to emitter voltage. The current that flows in transistor Q90 during clamping is about 10 mA. Transistors Q90 and Q91 are of the same type operating in a similar ambient temperature. The higher collector current in transistor Q90 causes a larger base to emitter voltage than in transistor Q91, such that the difference, about 100 mV, tends to stay constant with temperature changes.

Integration of the horizontal parabola is reset by the discharge of the integration capacitor C90 by transistor Q92 during the first half of the horizontal reset pulses and is allowed to start during the second half of the horizontal reset pulses. The function being integrated during this time is a negative going capacitance discharge due to the effect of resistor R92 and transistor Q93 on the voltage of capacitor C91. This causes an increasing positive slope in the horizontal parabola during the first 5 μsec of integration instead of the decreasing positive slope that is characteristic of a parabola. This flaring of the horizontal parabola helps straighten the horizontal lines at the left edge of the picture.

Figure 6:
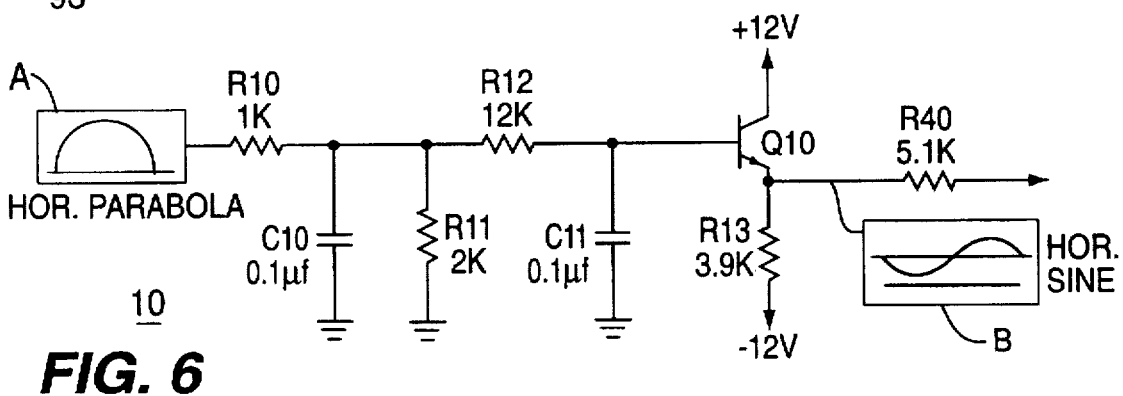
FIG. 6 is a schematic diagram of the sine wave generator shown in FIG. 4.

The horizontal parabola waveform A is low pass filtered and phase shifted in sine wave generator 10 as shown in FIG. 6 to produce a waveform B, shown as a horizontal sine with a positive going zero crossing about 5 μsec before horizontal mid scan, a DC average value of 1.35 volts and a 1.6 volts peak to peak amplitude. The horizontal parabola is low pass filtered by a network including resistors R10, R11 and R12 and capacitors C10 and C11. The filtered signal is buffered by transistor Q10, which is emitter biased by resistor R13.

The horizontal sine wave B is AC coupled to pin 5 of the waveform multiplier 30 through capacitor C40. A DC bias is established by an R-C network including resistors R41, R42 and R43 and capacitor C41. A second horizontal sine waveform can be supplied by AC coupling waveform B through capacitor C44 to gain determining resistors R48, R49 and R50. The amplitudes of the first and second horizontal sine waveforms will be different.

A vertical rate parabola waveform C is AC coupled to pin 3 of waveform multiplier 30 through capacitor C42. Waveform C has a peak to peak voltage of about 4 volts. After the AC coupling, a DC level is established by a calibration signal VCAL, acting through resistor R44. The calibration signal VCAL is coupled to pin 2 of the waveform multiplier 30, and stabilizes the multiplier in a manner which forces the vertical rate parabola to have a zero value during vertical retrace. This forces the output product signal to have an AC zero level during vertical retrace.

The horizontal rate sine waveform and the vertical rate parabola are multiplied by one another in waveform multiplier 30. The waveform multiplier 30 may be a Panasonic AN614 multiplier. The product output signal from pin 7 of the multiplier, which is a correction signal for correcting residual inner pincushion distortion, is buffered by transistor Q41 and AC coupled through capacitor C43 to gain determining resistors R45, R46 and R47.

It is necessary that either the correction signal or the second horizontal sine waveform be inverted before being combined to define a composite correction signal. This inversion, which effectively inverts the first and second horizontal sine waves relative to one another, results in correction of the horizontal linearity distortion imparted by the correction of the residual inner pincushion distortion. This can be accomplished by using the inverting and non-inverting inputs of summing operational amplifiers for the product signal output and the second horizontal sine waveform, as illustrated by coil driver 61.

In circuit 2, resistors R45, R46 and R47 couple the (residual inner pincushion) correction signal to the inverting inputs of the blue, red and green horizontal convergence coil driver amplifiers, respectively. Resistors R48, R49 and R50 couple the second horizontal sine waveform to the noninverting inputs of the blue, red and green horizontal convergence coil driver amplifiers, respectively. The green horizontal convergence coil driver 61 is shown in FIG. 4. The output of the respective driver amplifiers are composite correction signals which are inputs to respective power amplifiers, for example, green power amplifier 62. The outputs of the respective power amplifiers drive the respective horizontal convergence coils, for example green convergence coil 63. The composite correction signal corrects the residual inner pincushion distortion and corrects the horizontal linearity distortion imparted by the correction of the residual inner pincushion distortion.

It is not unusual for generated waveforms, for example the first horizontal sine waveform, to exhibit some asymmetry. When the first and second horizontal rate sine waves are generated by the same waveform generator, and are essentially the same waveform except for some difference only in amplitude, the composite correction signal further tends to correct any distortion due to the asymmetry of the generated waveform. In this case, distortion due to an asymmetry of the horizontal sine waveform is corrected.

Figure 7:
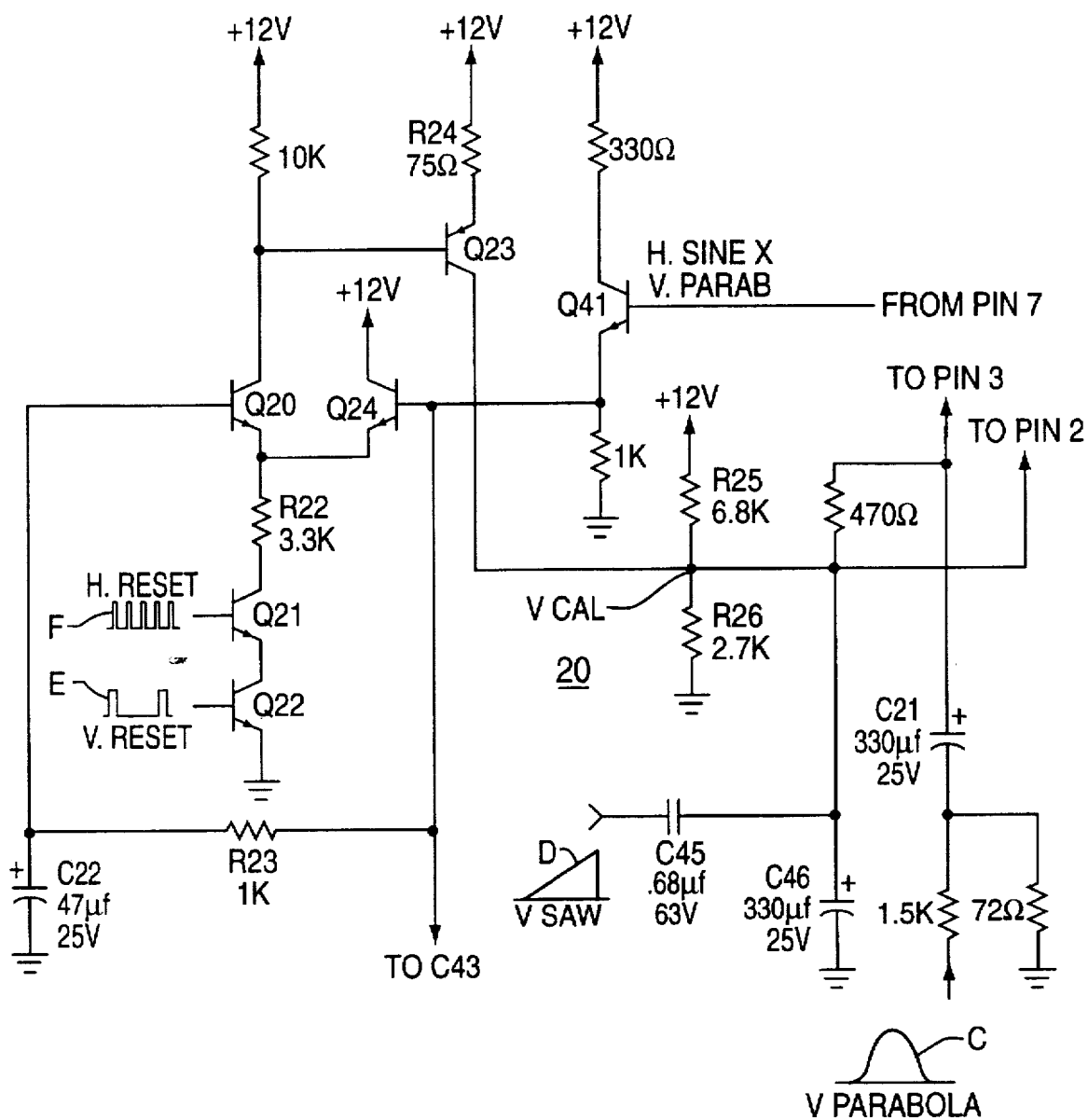
FIG. 7 is a schematic diagram of the feedback stabilizing circuit shown in FIG. 4.

The calibration signal VCAL for the multiplier 30 is produced automatically in a feedback control loop mode of operation by feedback stabilizing circuit 20, as shown in FIG. 7. The pin 7 output of multiplier 40, the product of the vertical rate parabola waveform and the horizontal rate sine waveform, is buffered by transistor Q41 and coupled to the base of transistor Q24, which forms a differential amplifier with transistor Q20. The base voltage of transistor Q20 is developed by passing the product signal output through a low pass filter formed by resistor R23 and capacitor C22. As a result, the base voltage of transistor Q20 does not contain an AC component signal and has a DC magnitude that is equal to the average value of the base voltage of transistor Q24.

A pair of transistor switches Q21 and Q22 are coupled in series for producing an emitter current through resistor R22 in one or both of transistors Q24 and Q20 when both transistor switches 021 and Q22 conduct. Transistor switch Q22 is turned on by a vertical rate blanking signal E, only during the vertical blanking interval. Transistor switch Q21 is turned on by horizontal retrace pulses F.

The collector of transistor Q20 is coupled to the base of transistor Q23 for turning on transistor Q23 when transistor Q20 is conductive. Otherwise, transistor Q23 is non conductive. The emitter of transistor Q23 is coupled to the +12 volt supply through resistor R24. The emitter/collector current of transistor Q23 is determined by resistor R24 when transistor Q23 is turned on by transistor Q20. The collector of transistor Q23 is coupled to capacitor C21, to charge capacitor C21 when transistors Q20 and Q23 are conductive. A voltage divider formed by resistors R25 and R26 determines the DC voltage level in capacitor C21.

In steady state operation, transistor Q23 produces a collector current that increases the voltage level of signal VCAL above what is set by resistors R25 and R26. The voltage difference between the base voltages of transistors Q24 and Q20 is proportional to the peak to peak amplitude of the product output signal during the vertical blanking interval. The voltage difference between the base voltages of transistors Q24 and Q20 is sampled for controlling the conduction of transistor Q23.

Should the peak to peak amplitude of the product output signal tend to increase during the vertical blanking interval, transistor Q23 would turn on harder and for a longer time interval so as to increase the DC signal VCAL. In this way, the peak to peak amplitude of the product output signal is automatically reduced during the vertical blanking interval. On the other hand, should the product output signal tend to decrease, during horizontal blanking interval, transistor Q23 will not turn on and signal VCAL will decrease until signal VCAL becomes sufficiently small to cause polarity reversal. Thus, in steady state operation, during the vertical blanking interval, the phase of the product output signal is a predetermined phase and its amplitude is at a minimum as controlled by the feedback loop gain.

The sampling characteristic of feedback stabilizing circuit 20 results in a distortion in which horizontal lines exhibit a droop. This droop distortion can be corrected by inserting a vertical rate sawtooth waveform D at the junction of the VCAL signal and pin 2 of multiplier 30, as shown in FIG. 4. The vertical sawtooth waveform has a peak to peak voltage of about 4 volts. The vertical sawtooth is coupled through a capacitive divider formed by capacitors C45 and C46.

The invention generates convergence correction signals which fully correct residual inner pincushion distortion. Further, the invention is compatible with a feedback stabilizing arrangement which can be provided to improve the operation of the waveform multiplier. Moreover, the first and second horizontal rate sine waves are generated by the same waveform generator, so that the composite correction signal further corrects any distortion due to asymmetry of the horizontal rate sine waveform.

What is claimed is:

1. A correction circuit for a cathode ray tube displaying images subject to distortions, said circuit comprising:

means for generating a vertical rate waveform having a generally parabolic shape;

means for clamping said vertical rate waveform to a point of reference potential during a vertical retrace period;

means for combining a first horizontal rate waveform of a generally sinusoidal waveshape, having opposite peak values during horizontal trace, with said vertical rate waveform to define a correction signal; and means for generating a dynamic magnetic field in said cathode ray tube responsive to said correction signal, said correction signal correcting inner pincushion distortion.

2. A correction circuit for a cathode ray tube displaying images subject to distortions, said circuit comprising:

means for generating a vertical rate waveform having a generally parabolic shape;

means for causing said vertical rate waveform to exhibit a zero value during a vertical retrace period;

means for combining a first horizontal rate waveform of a generally sinusoidal waveshape with said vertical rate waveform to define a correction signal; and, means for generating a dynamic magnetic field in said cathode ray tube responsive to said correction signal, said correction signal correcting inner pincushion distortion.

3. A correction circuit for a cathode ray tube displaying images subject to distortions, said circuit comprising:

means for generating a vertical rate waveform having a generally parabolic shape;

means for clamping said vertical rate waveform to a point of reference potential during a vertical retrace period;

means for combining a first horizontal rate waveform of a generally sinusoidal waveshape with said vertical rate waveform to define a correction signal;

means for combining a second horizontal rate waveform of a generally sinusoidal waveshape with said correction signal to define a composite correction signal; and, means for generating a dynamic magnetic field in said cathode ray tube responsive to said composite correction signal, said composite correction signal having a first component for correcting an inner pincushion distortion and a second component for correcting a horizontal linearity correction.

4. The circuit of claim 3, further comprising means for inverting one of said correction signal and said second horizontal rate waveform.

5. The circuit of claim 3, wherein said first and second horizontal rate waveforms are generated by the same waveform generating means, said composite correction signal further correcting distortion due to asymmetry of said horizontal rate waveform as generated by said same waveform generating means.

6. The circuit of claim 1, wherein said means for generating said dynamic magnetic field in said cathode ray tube responsive to said composite correction signal comprises an auxiliary deflection coil.

7. The circuit of claim 6, wherein said auxiliary correction coil is a convergence correction coil.

8. A correction circuit for a cathode ray tube displaying images subject to distortions, said circuit comprising:

a multiplier for generating as an output a product of a horizontal rate sine waveform and a vertical rate waveform to define a correction waveform;

said vertical rate waveform having a generally parabolic shape;

said vertical rate waveform being clamped to a point of reference potential during a vertical retrace period;

an inverter for one of said horizontal rate sine waveform and said correction signal;

a summer for combining said horizontal rate sine waveform and said correction waveform, one of which has been inverted by said inverter, to define a composite correction signal; and, a correction coil for said cathode ray tube coupled for receiving said composite correction signal and generating a dynamic magnetic field responsive to said composite correction signal, said composite correction signal having a first component for correcting a first distortion and a second component for correcting a second distortion imparted by said correcting of said first distortion.

9. The circuit of claim 8, wherein said first component of said correction signal corrects a residual inner pincushion distortion and said second component of said correction signal corrects a horizontal inner linearity distortion imparted by said correcting of said residual inner pincushion distortion.

10. The circuit of claim 9, wherein said residual inner pincushion distortion is due to modification of a main horizontal deflection signal to correct East/West pincushion distortion.

11. The circuit of claim 8, wherein said composite correction signal also corrects any distortion due to asymmetry of said horizontal rate sinusoidal waveform.

12. The circuit of claim 8, wherein said vertical rate waveform waveform has a zero value during vertical retrace.

13. A correction circuit for a cathode ray tube displaying images subject to distortions, said circuit comprising:

means for multiplying a first horizontal rate sine waveform by a vertical rate waveform to define a correction signal;

said vertical rate waveform having a generally parabolic shape;

said vertical rate waveform being clamped to a point of reference potential during a vertical retrace period;

means for combining a second horizontal rate sine waveform and said correction signal to define a composite correction signal; and, means for generating a dynamic magnetic field in said cathode ray tube responsive to said composite correction signal, said composite correction signal having a first component for correcting an inner pincushion distortion and a second component for correcting a horizontal linearity correction.

14. The circuit of claim 13, further comprising means for inverting one of said correction signal and said second horizontal rate waveform.

15. The circuit of claim 13, wherein said first and second horizontal rate waveforms are generated by the same waveform generating means, said composite correction signal further correcting distortion due to asymmetry of said horizontal rate waveform as generated by said same waveform generating means.

16. The circuit of claim 13, wherein said means for generating said dynamic magnetic field in said cathode ray tube responsive to said composite correction signal comprises an auxiliary convergence correction coil.

17. The circuit of claim 13, wherein said vertical rate waveform waveform has a zero value during vertical retrace.

18. A correction circuit for a cathode ray tube displaying images subject to distortions, said circuit comprising:

a waveform multiplier for combining a horizontal rate sine waveform and a vertical rate waveform to define a correction signal;

said vertical rate waveform having a generally parabolic shape;

said vertical rate waveform being clamped to a point of reference potential during a vertical retrace period; and, an auxiliary convergence correction coil for generating a dynamic magnetic field in said cathode ray tube responsive to said correction signal, said correction signal correcting horizontal inner pincushion distortion.

19. A correction circuit for a cathode ray tube displaying images subject to distortions, said circuit comprising:

a signal generator for generating a vertical rate waveform having a generally parabolic shape;

a clamp for clamping said vertical rate waveform substantially to a zero volt level during a vertical retrace period;

a waveform multiplier for combining a horizontal rate sinusoidal waveform said vertical rate waveform to define a correction signal;

a summing operational amplifier for adding a second horizontal rate sinusoidal waveform to said correction waveform; and, an auxiliary convergence correction coil for generating a dynamic magnetic field in said cathode ray tube responsive to said correction signal, said correction waveform correcting an inner pincushion distortion and a horizontal linearity distortion.

20. The circuit of claim 19, wherein said summing operation amplifier has a non inverting input coupled to one of said second horizontal rate waveform and said correction signal and has an inverting input coupled to the other of said second horizontal rate waveform and said correction signal.

21. A correction circuit for a cathode ray tube displaying images subject to distortions, said circuit comprising:

means for generating a vertical rate waveform having a generally parabolic shape;

means for clamping said vertical rate waveform to a point of reference potential during a vertical retrace period;

means for combining a first horizontal rate waveform of a generally sinusoidal waveshape with said vertical rate waveform to define a correction signal; and, means for generating a dynamic magnetic field in said cathode ray tube responsive to said correction signal, said correction signal correcting horizontal inner pincushion distortion.

22. The circuit of claim 1, wherein said combining means comprises a waveform multiplier.

23. The circuit of claim 2, wherein said combining means comprises a waveform multiplier.

24. The circuit of claim 3, wherein said combining means comprises a waveform multiplier.

25. The circuit of claim 13, wherein said combining means comprises a waveform multiplier.

26. The circuit of claim 21, wherein said combining means comprises a waveform multiplier.

* * * * *